US012241630B2

(12) United States Patent
Hatambeiki et al.

(10) Patent No.: US 12,241,630 B2
(45) Date of Patent: *Mar. 4, 2025

(54) SYSTEM AND METHOD FOR AGGREGATING AND ANALYZING THE STATUS OF A SYSTEM

(71) Applicant: Universal Electronics Inc., Scottsdale, AZ (US)

(72) Inventors: Arsham Hatambeiki, San Diego, CA (US); Paul D. Arling, Irvine, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,867

(22) Filed: Oct. 5, 2023

(65) Prior Publication Data

US 2024/0031192 A1 Jan. 25, 2024

Related U.S. Application Data

(63) Continuation of application No. 18/097,603, filed on Jan. 17, 2023, now Pat. No. 11,817,965, which is a
(Continued)

(51) Int. Cl.
F24C 15/02 (2006.01)
F24C 7/08 (2006.01)
(Continued)

(52) U.S. Cl.
CPC ............ *F24C 15/022* (2013.01); *F24C 7/085* (2013.01); *H04L 12/2814* (2013.01);
(Continued)

(58) Field of Classification Search
CPC .. G06F 3/04883; G06F 3/0425; G06F 3/0428; H04L 63/10; H04L 63/20;
(Continued)

(56) References Cited

U.S. PATENT DOCUMENTS 6,480,901 B1 11/2002 Weber et al.
2004/0015242 A1 1/2004 Brown et al.
(Continued)

FOREIGN PATENT DOCUMENTS

JP 2007241721 A 9/2007
JP 2012-529709 A 11/2012
WO 2004095269 A2 11/2004

OTHER PUBLICATIONS

ISA/US, International Search Report and Written Opinion issued on PCT application No. US16/16164, dated Apr. 8, 2016, 11 pages.
(Continued)

*Primary Examiner* — Michael A Keller
*Assistant Examiner* — Thao D Duong
(74) *Attorney, Agent, or Firm* — Greenberg Traurig, LLP

(57) ABSTRACT

A listing of each of the plurality of appliances is used, with reference to a command and/or protoctol database, to configure a software agent to exchange communications, via a one or more communication channels, with each of the plurality of appliances. An action triggering state of at least one of the plurality of appliances is associated with an action. The action is performed when it is determined that a current state of the at least one of the plurality of appliances corresponds to the action triggering state.

11 Claims, 4 Drawing Sheets

Related U.S. Application Data continuation of application No. 14/618,365, filed on Feb. 10, 2015, now Pat. No. 11,575,534.

(51) Int. Cl.

| | | |
|---|---|---|
| *H04L 12/28* | (2006.01) | |
| *H04L 12/64* | (2006.01) | |
| *H04L 41/0853* | (2022.01) | |
| *H04L 41/0893* | (2022.01) | |
| *H04L 41/12* | (2022.01) | |
| *H04L 67/51* | (2022.01) | |

(52) U.S. Cl.
CPC ...... *H04L 12/6418* (2013.01); *H04L 41/0853* (2013.01); *H04L 41/0893* (2013.01); *H04L 41/12* (2013.01); *H04L 67/51* (2022.05)

(58) Field of Classification Search
CPC . H04L 67/02; H04L 63/0428; H04L 63/0853; H04L 65/1069
See application file for complete search history.

(56) References Cited

U.S. PATENT DOCUMENTS

| | | |
|---|---|---|
| 2005/0015458 A1 | 1/2005 | La |
| 2005/0096753 A1 | 5/2005 | Arling et al. |
| 2005/0159823 A1 | 7/2005 | Hayes et al. |
| 2005/0216302 A1 | 9/2005 | Raji et al. |
| 2007/0208837 A1* | 9/2007 | Tian ................. G06F 3/1232 709/223 |
| 2008/0220722 A1 | 9/2008 | Smith |
| 2009/0119743 A1* | 5/2009 | Werner ................. G06F 13/387 709/224 |
| 2013/0107131 A1 | 5/2013 | Barnett et al. |
| 2014/0022049 A1 | 1/2014 | Kohanek |
| 2014/0176310 A1 | 6/2014 | Kotlicki |
| 2014/0208214 A1* | 7/2014 | Stern ...................... H04L 41/22 715/734 |
| 2014/0297794 A1* | 10/2014 | Staurnes ................. H04L 67/02 709/217 |
| 2014/0366050 A1 | 12/2014 | Hatambeiki et al. |
| 2015/0002289 A1 | 1/2015 | Okeefe et al. |
| 2015/0010167 A1 | 1/2015 | Arling |
| 2015/0256397 A1 | 9/2015 | Agarwal |
| 2015/0334165 A1 | 11/2015 | Arling et al. |
| 2016/0239185 A1 | 8/2016 | Balimidi et al. |
| 2016/0353403 A1 | 12/2016 | Liu |
| 2017/0279680 A1 | 9/2017 | Sebastian et al. |
| 2018/0167652 A1 | 6/2018 | Sjöström |

OTHER PUBLICATIONS

JPO, Office Action issued on Japanese patent application No. 2017-541795, received Jun. 11, 2020, 6 pages.

CNIPA, office action issued on Chinese patent application No. 201680009713.1, received Oct. 9, 2019, 16 pages.

JPO, office action issued on Japanese patent application No. 2017-541795, received Dec. 16, 2019, 16 pages.

European Patent Office, extended European Search Report issued on EP patent application No. 16749602.5, received Dec. 11, 2017, 9 pages.

Office Action from Korean application No. 10-2017-7024962, received Jun. 22, 2023, 16 pp.

* cited by examiner

SYSTEM AND METHOD FOR AGGREGATING AND ANALYZING THE STATUS OF A SYSTEM

RELATED APPLICATION INFORMATION

This application claims the benefit of U.S. application Ser. No. 18/097,603, filed on Jan. 17, 2023, which application claims the benefit of U.S. application Ser. No. 14/618,365, filed on Feb. 10, 2015, which applications are incorporated herein by reference in their entireties.

BACKGROUND

Increasingly, the modern home or business may be populated by a variety of "smart" devices. Such devices may include, for example, various items of home entertainment equipment such as TVs, AV receivers, cable set top boxes, etc.; intelligent thermostats; lighting control systems; personal activity tracking devices; household and kitchen appliances; security and alarm systems; as well as personal computers, tablets, smartphones, and the like. While such devices are increasingly capable of wireless communication, there is often little or no provision for sharing of information amongst the various devices and systems, or for synergistic cooperation between these devices.

SUMMARY

The following generally describes smart systems that may be found in a home or business environment, and more particularly systems and methods for facilitating aggregation and synergistic use of the operational and status data which may be gathered from the various smart devices forming such a system. To this end an exemplary software agent capable of communication with the various devices forming a system may aggregate, store, and analyze status and functional data available from such devices. Various actions may be initiated by the software agent based on this analysis, for example proactive thermostat adjustments, security system setting changes, etc.

A better understanding of the objects, advantages, features, properties and relationships of the claimed invention will be obtained from the following detailed description and accompanying drawings which set forth illustrative embodiments and which are indicative of the various ways in which the principles of the claimed invention may be employed.

BRIEF DESCRIPTION OF THE DRAWINGS

For a better understanding of the various aspects of the systems and methods described hereinafter, reference may be had to the attached drawings in which.

It will be appreciated that for clarity of illustration, the size of some of the illustrative elements in the above listed Figures may be exaggerated relative to other elements, i.e. the elements illustrated in the Figures are not necessarily drawn to scale.

DETAILED DESCRIPTION

Figure 1:
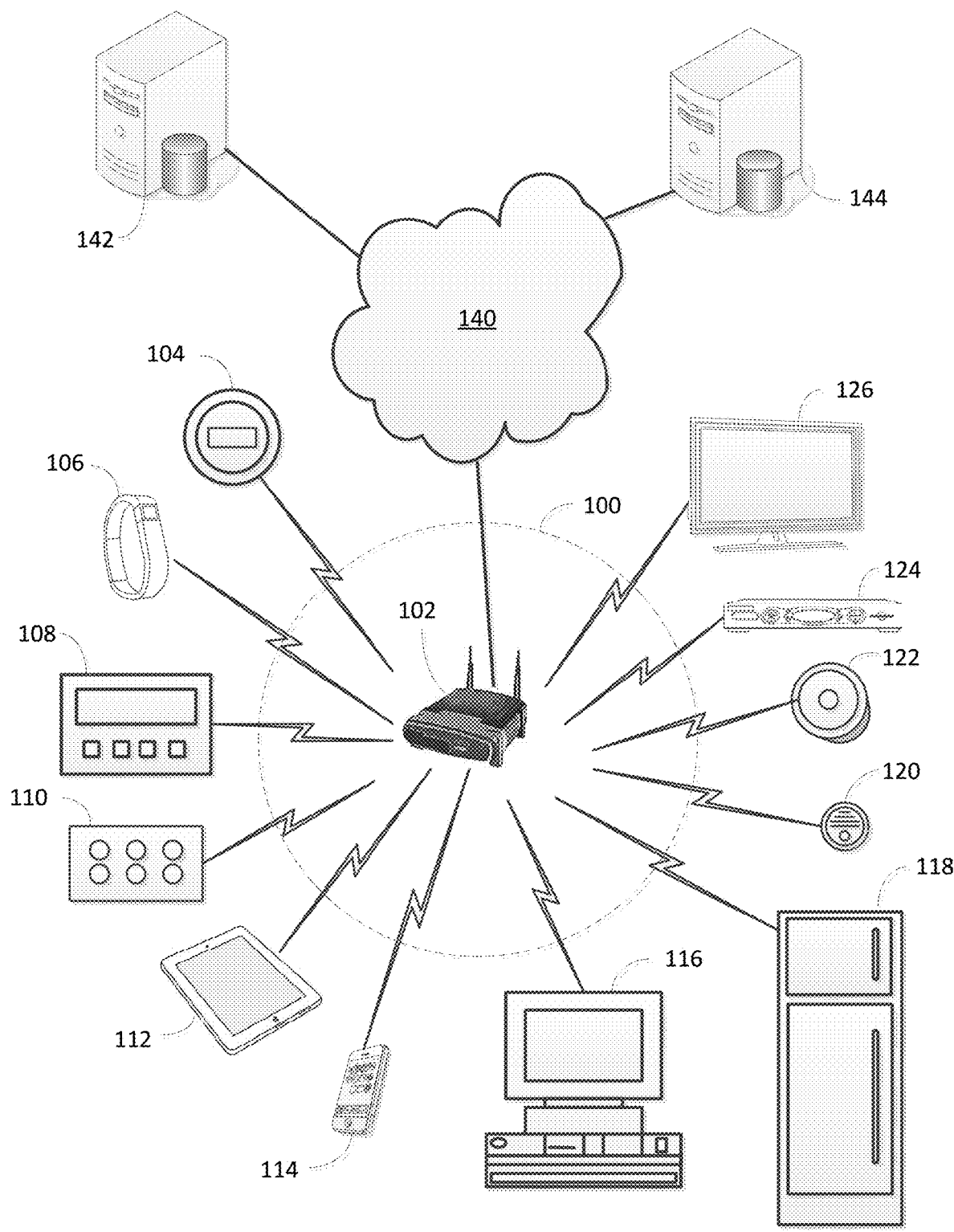
FIG. 1 illustrates an exemplary system in which the teachings of the subject disclosure may be utilized.

With reference to FIG. 1, an exemplary system of devices in a household may include without limitation a smart thermostat 104, one or more personal activity monitors 106, a security system base station 108, a lighting controller 110, one or more tablet computers 112, one or more smart phones 114, a personal computer 116, one or more kitchen appliances such as refrigerator 118, one or more smoke and/or carbon monoxide detectors 120; a robotic vacuum cleaner 122, and various entertainment appliances such as for example cable STB 124 and TV 126. In the exemplary system, these devices may be equipped to communicate wirelessly, for example via an RF signal such as contemplated by RF4CE, Zwave, Bluetooth, etc.; ultrasonic signal; visible light; etc., as appropriate for the control of each particular appliance, for example or over a WiFi network 100, in order to report status, alarms, fault conditions, etc., and in some cases to receive operational commands. As will be understood, other proprietary wireless or wired networks may also be present, for example between an alarm system base station and its various sensors, between smoke detectors situated at multiple locations in the household, between an HVAC system and its smart temperature sensors, between a cable STB and its headend, etc. The exemplary WiFi network may be managed by a router and wireless access point 102, via which access to the Internet 140 and remote servers 142,144 may also be made available to those devices equipped with appropriate software.

However, while the illustrated devices may all be capable of wireless signaling, they may not support full intercommunication amongst themselves. For example, thermostat 104 and personal activity monitor 106 may only be adapted to communicate with specific manufacturer-supplied apps resident on smart phone 112, alarm base station 108 may only be adapted to communicate with a cloud-based central monitoring facility maintained by the alarm system vendor, etc. It will also be appreciated that the system may provide indirect communication between the wireless access point 102 and desired target appliance via a relay device which is responsive to wireless communications and which may support a plurality of RF protocols and which may communicate to a desired appliance which may contain a software agent.

Figure 2:
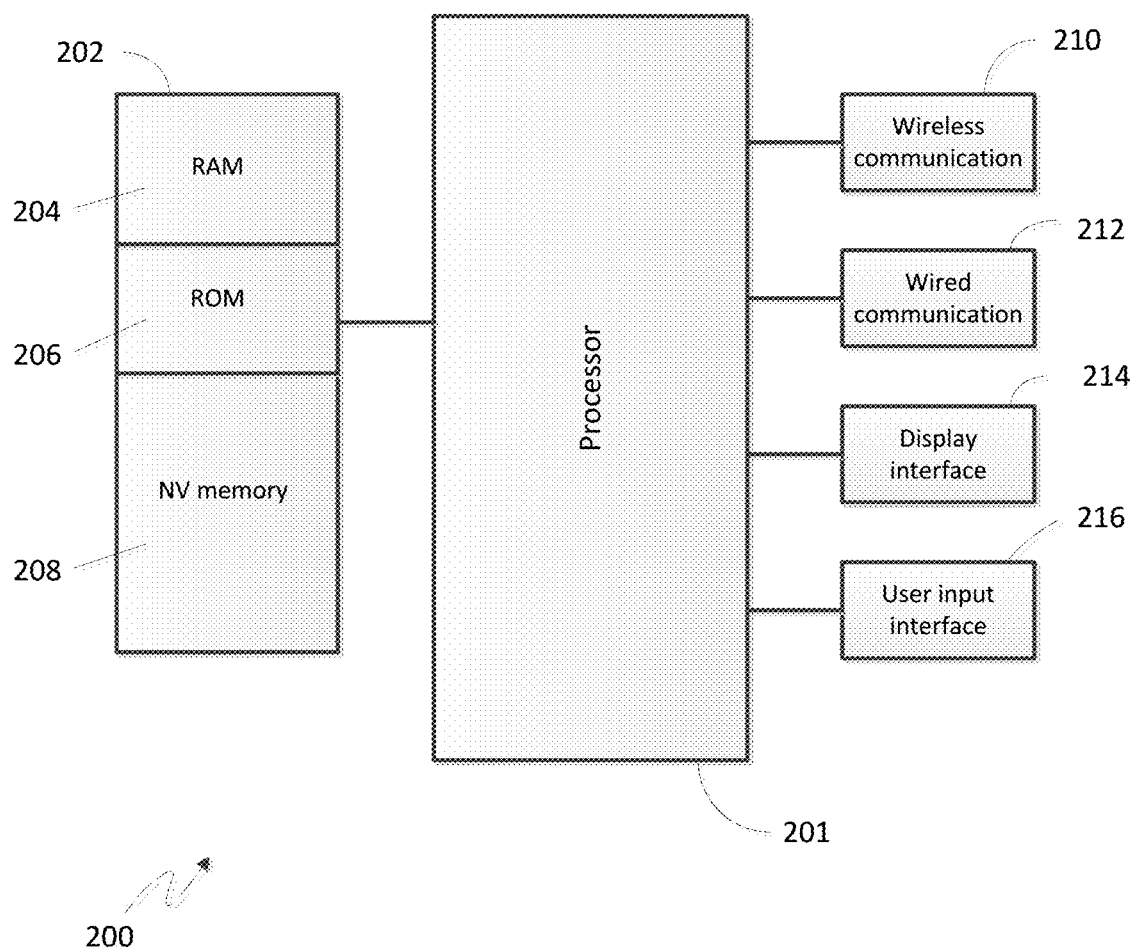
FIG. 2 illustrates a block diagram of a computing device platform upon which an exemplary software agent in keeping with the teachings of the subject disclosure may be implemented.

More particularly, the software agent may comprise programming instructions which, when executed on an appliance, such as the exemplary computing-capable device 200 illustrated in FIG. 2, may perform the steps and functions of the methods described herein. Computing-capable device 200 may comprise a central processor 201 coupled to a memory system 202 which memory system may comprise one or more of RAM memory, ROM memory 206 and non-volatile memory 208. As will be appreciated, some or all of the elements of memory system 202 may take the form of a chip, a hard disk, a magnetic disk, an optical disk, FLASH memory, and/or the like, and all or portion of the elements of memory system 202 may be physically incorporated within the same IC chip as the central processor 201 and, as such, memory system 202 is shown separately in FIG. 2 only for the sake of clarity. Computing-capable device 200 may further comprise, as required for a particular purpose, one or more wireless communication interfaces 210, for example WiFi, Bluetooth, or the like; one or more wired communication interfaces 212, for example, Ethernet, USB, or the like; a display interface 214 for output to one or more of a LED, LCD, computer monitor, TV, etc.; and a user input interface 216, for connection to for example a keypad, touchscreen, pointing device, remote control, or the like. Once again, in some embodiments all or portion of interfaces 210 through 216 may be physically incorporated within the same IC chip as the central processor 201 and, as such, are shown separately in FIG. 2 only for the sake of clarity. Further, as will become apparent hereafter, in certain embodiments user interface functionality 214,216 may be embodied in a physically separate device, for example smart phone 114 or PC 116 and accessed wirelessly by a software agent resident in computing-capable device 200.

For the purposes of this invention, computing-capable device 200 may comprise a separate standalone unit provisioned specifically to provide a platform for the software agent programming, or alternatively, computing-capable device 200 providing the platform for the software agent programming may comprise all or part of an appliance, for example a cable STB 124, smart phone 114, PC 116, or even server 142. It is also contemplated that in some embodiments software agent functionality may be divided amongst multiple computing-capable devices, for example data capture may be performed locally by a device such as STB 124, and analysis of such captured data may performed remotely by server 142. Accordingly, in the descriptions that follow it will be understood that the physical platform upon which the disclosed software agent functionality is resident may comprise any of the above forms, or any other convenient configuration, as appropriate for a particular embodiment.

Figure 3:
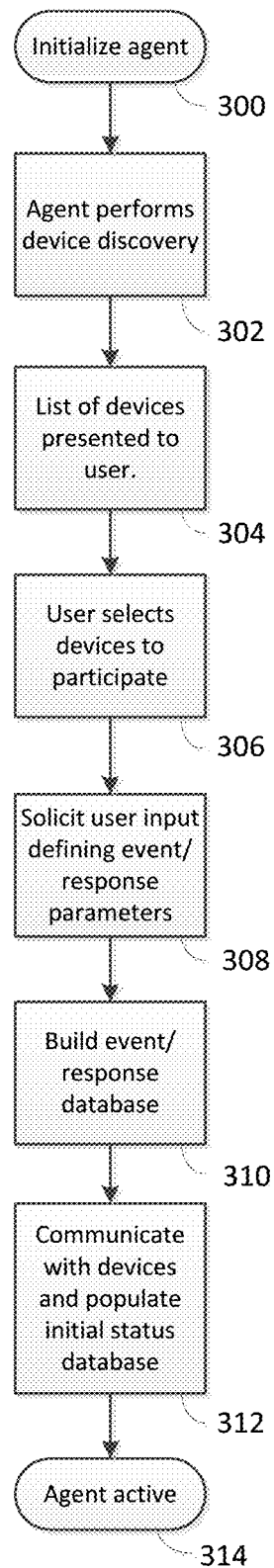
FIG. 3 illustrates an exemplary series of steps which may be performed to initially configure an exemplary software agent.

Turning now to FIG. 3, an exemplary software agent for aggregation of the overall status of the system of FIG. 1 may be initialized upon installation on a suitable computing device, as follows. After startup 300, at step 302 the software agent may perform device discovery in order to establish a listing of all responsive devices in the system. Such discovery may comprise polling devices on a network, for example WiFi network 100 or any other network, wired or wireless, which may be present in the environment and accessible to the software agent; communicating with a universal remote control or remote control app and/or associated database to ascertain which controllable devices the remote control has been configured to communicate with; soliciting input from a user; etc., all as may be appropriate to a particular configuration. Such discovery may also include comparing retrieved device characteristics to a database of such characteristics in order to uniquely identify devices, for example as described in U.S. Pat. No. 8,812,629 "System and Method for Configuring the Remote Control Functionality of a Portable Device" and/or pending U.S. patent application Ser. No. 12/148,444 "Using HDMI-CEC to Identify a Codeset," both of common ownership and incorporated herein by reference in their entirety.

As devices are identified, the exemplary software agent may further reference a command and/or protocol database, local and/or remote, e.g. on server 142 or 144, in order to configure itself to effectively communicate with the discovered devices.

After discovery is complete, at step 304 the software agent may present a user with a listing of all discovered devices and at step 306 allow the user to select those devices which are to participate in status aggregation. Once the participating devices have been identified, at step 308 user input may be solicited to define a series of event/response parameters. In this context, an event/response parameter may comprise the association of a particular system status with an action which is to be taken by the software agent upon the system entering into that status. For convenience, in some embodiments certain event responses may be pre-programmed by default, for example responses to arrival or departure of a user, detection of an intruder, etc. After user entry, and if necessary editing of default responses, is complete, at step 310 the software agent may build a database of event/response parameters for use as will be described hereafter. Finally, at step 312 the software agent may ascertain the current status of all configured devices in the system in order to build and populate a system status database, after which at step 314 the software agent enters normal active status as will now be described in conjunction with FIG. 4.

As will be appreciated, an exemplary system status database may include not only the operational status of all the devices participating in the system, but also other pertinent data such as user location within or outside the home (determined for example from smart phone 114 (using image capturing, use sensing, device proximity or the like), sensed presence of activity monitor 106, security system data, image capture date, etc.); date, day of week, and time of day; current weather conditions and forecast (obtained for example from Internet server 144); times and durations of discounted energy pricing; etc.

Figure 4:
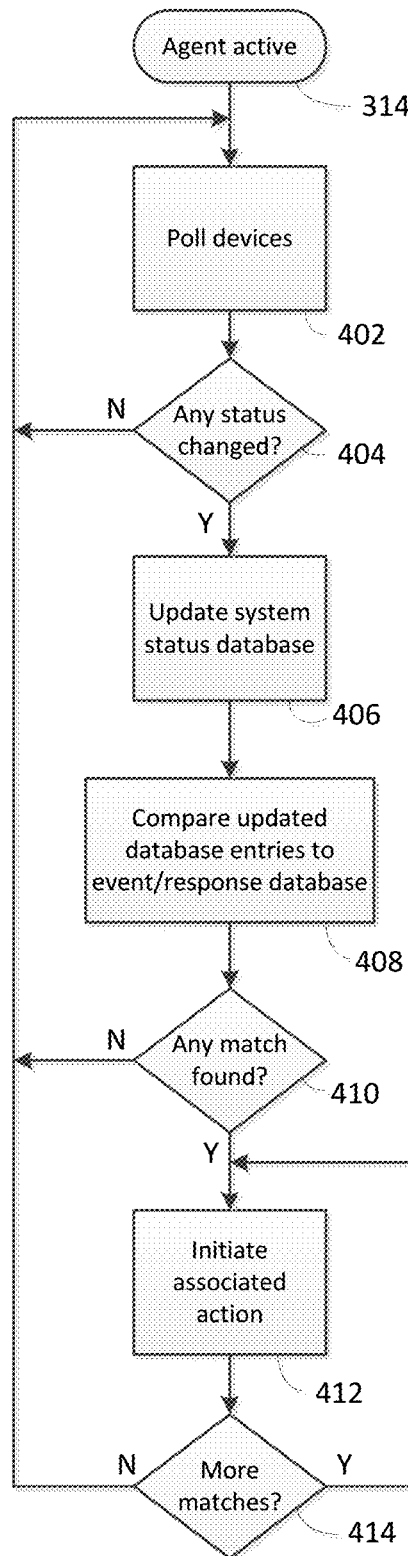
FIG. 4 illustrates an exemplary series of steps which may be performed by an exemplary software agent upon receipt of device or system status change data.

Turning to FIG. 4, at step 402 the actions of an exemplary software agent during normal operation may comprise periodic communication with the devices present in the system in order to track changes in the status of those devices. As will be appreciated, such communication may be software agent or device initiated, i.e., polled or interrupt driven, or a combination thereof, as appropriate for a particular system. Upon completion of communication, at step 404 the software agent may determine if any changes in system status have occurred. If not, the periodic communication of step 402 may be repeated. If however a change in system status is detected, at step 406 the exemplary system status database may be updated to reflect the new system status value(s). Thereafter, at steps 408 and 410 the updated system status may be compared to the system status entries stored in the event/response database. If no matches are found, the periodic communication of step 402 is repeated. If however a match is found, at step 412, the action associated with that status event may be performed. Thereafter, at step 414, the software agent may determine if further entries in the event/response database match the current status. If so, step 412 is repeated, if not, the periodic communication of step 402 may be repeated.

Examples of actions which may be initiated in this manner by an exemplary software agent may include, without limitation:

Receipt of a communication from a GPS-enabled smartphone 114 may indicate that a user is approaching home. An exemplary associated event/response parameter may cause a software agent to issue a command to thermostat 104 to exit energy-saving mode. Further, depending on the season and time of day, the exemplary software agent may additionally issue command(s) to lighting controller 110 to turn on one or more lights.

Receipt of a communication from security system base station 108 may indicate that an intruder has been detected. An exemplary event/response parameter may cause a software agent to issue command(s) to lighting controller 110 to turn both exterior and interior lights on at full brightness.

Status received from one or more personal activity monitor(s) 106 indicate that all occupants of the home are asleep. An exemplary event/response parameter may cause a software agent to issue commands to TV 126 to power off that device if that device is still powered on; to change thermostat 104 setting to night eco mode; to cause lighting controller 110 to turn off any remaining lights downstairs, and to request security system 108 to enable downstairs motion sensors.

In a similar manner, if the reported status from an exemplary personal activity monitor 106 changes from "asleep" to "awake", an exemplary event/response parameter may cause a software agent to issue a command(s) to security system 108 to disable interior motion sensors.

The exemplary software agent of this invention may also act as a conduit to efficiently route device messages to a user in a timely and convenient manner. For example, when a battery-powered alarm system sensor reports a low battery state to security system base station 108, a battery purchase requirement may be forwarded by the exemplary software agent to smart phone 114 for entry into a location based reminder system such as for example Google now. Similarly, an "over temperature" status from refrigerator 118 or a "bag full" status from automatic vacuum cleaner 122 may cause an exemplary software agent to forward appropriate messages to smartphone 114 or tablet 116, or even cause a message to be displayed on TV 126, depending on the current location of a user as determined by, for example smart phone 114 or personal activity monitor 106.

As will be appreciated, many further event/response scenarios may be supported by the above described exemplary software agent and alternate embodiments thereof. Accordingly, it should be understood that the above scenarios and use cases are presented by way of example only, without limitation.

While various concepts have been described in detail, it will be appreciated by those skilled in the art that various modifications and alternatives to those concepts could be developed in light of the overall teachings of the disclosure. For example, while the exemplary methods are presented above in the context of a home system, it will be appreciate that the principles disclosed herein may be broadly applied to, for example, offices, factories, theaters, department stores, shopping malls, airports, etc.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for controlling a state of a system comprised of a plurality of appliances, the method comprising:

identifying a corresponding plurality of command code sets for the plurality of appliances in the system, wherein each identified one of the plurality of command code sets comprises a collection of commands and system data and a protocol for use in generating an operational signal that will be understood by a particular electronic consumer device;

associating within a centralized software agent an action triggering state with an action to be performed by the centralized software agent;

receiving by the centralized software agent, via a network interlinking the centralized software agent and each of the plurality of appliances in the system, a message from the at least one of the plurality of appliances in the system, the message having data indicative of a determined state of an individual registered with the centralized software agent; and causing the centralized software agent to perform the action when it is determined by the centralized software agent that the determined state of the individual corresponds to the action triggering state;

wherein the action comprises the centralized software agent using a one or more of the identified, plurality of command code sets to generate one or more operational commands for transmission, via the network, to a target one or more of the plurality of appliances in the system to thereby cause a change in state of the target one or more of the plurality of appliances.

2. The method as recited in claim 1, wherein the centralized software agent causes a display of a user interface having input elements for allowing a user to manually associate the action triggering state with the action to be performed by the centralized software agent.

3. The method as recited in claim 1, wherein the determined state of the individual comprises a determined location of the individual.

4. The method as recited in claim 1, wherein the determined state of the individual comprises a determined sleep state of the individual.

5. The method as recited in claim 1, wherein the determined state of the individual comprises a determined direction of travel of the individual.

6. A non-transitory, computer readable media having instructions stored thereon for controlling a state of a system comprised of a plurality of appliances, the instructions, when executed by a device, performing steps comprising:

causing a corresponding plurality of command code sets for the plurality of appliances in the system to be identified, wherein each identified one of the plurality of command code sets comprises a collection of commands and system data and a protocol for use in generating an operational signal that will be understood by a particular electronic consumer device;

causing an action triggering state to be associated in a data repository accessible by the device with an action to be performed by the centralized software agent;

receiving by the device, via a network interlinking the centralized software agent and each of the plurality of appliances in the system, a message from the at least one of the plurality of appliances in the system, the message having data indicative of a determined state of an individual registered with the system; and performing by the device the action when it is determined by the device that the determined state of the individual corresponds to the action triggering state;

wherein the action comprises the device using a one or more of the identified, plurality of command code sets to generate one or more operational commands for transmission, via the network, to a target one or more of the plurality of appliances in the system to thereby cause a change in state of the target one or more of the plurality of appliances.

7. The non-transitory, computer readable media as recited in claim 6, wherein the data repository is local to the device.

8. The non-transitory, computer readable media as recited in claim 6, wherein the instructions cause the device to display a user interface having input elements for allowing a user to manually associate the action triggering state with the action to be performed.

9. The non-transitory, computer readable media as recited in claim 6, wherein the determined state of the individual comprises a determined location of the individual.

10. The non-transitory, computer readable media as recited in claim 6, wherein the determined state of the individual comprises a determined sleep state of the individual.

11. The non-transitory, computer readable media as recited in claim 6, wherein the determined state of the individual comprises a determined direction of travel of the individual.

\* \* \* \* \*